US012189364B2

(12) United States Patent
Gonzalez Martin et al.

(10) Patent No.: US 12,189,364 B2
(45) Date of Patent: Jan. 7, 2025

(54) GEOMETRICAL TRANSFORMATIONS IN ADDITIVE MANUFACTURING

(71) Applicant: Hewlett-Packard Development Company, L.P., Spring, TX (US)

(72) Inventors: Sergio Gonzalez Martin, Sant Cugat del Valles (ES); Jordi Gonzalez Rogel, Sant Cugat del Valles (ES); Jordi Sanroma Garrit, Sant Cugat del Valles (ES); Jordi Raventos Catasus, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 353 days.

(21) Appl. No.: 17/417,781

(22) PCT Filed: Jul. 12, 2019

(86) PCT No.: PCT/US2019/041597
§ 371 (c)(1),
(2) Date: Jun. 24, 2021

(87) PCT Pub. No.: WO2021/010942
PCT Pub. Date: Jan. 21, 2021

(65) Prior Publication Data
US 2022/0128970 A1   Apr. 28, 2022

(51) Int. Cl.
*G05B 19/4099* (2006.01)
(52) U.S. Cl.
CPC ............ *G05B 19/4099* (2013.01); *G05B 2219/49023* (2013.01)
(58) Field of Classification Search
None
See application file for complete search history.

(56) References Cited

U.S. PATENT DOCUMENTS 10,317,882 B2 * 6/2019 de Pena ............... B29C 64/40
2013/0076731 A1   3/2013 Rolleston et al.
(Continued)

FOREIGN PATENT DOCUMENTS

EP   3013563 A1   5/2016
EP   3332297 B1   7/2019
(Continued)

OTHER PUBLICATIONS

Andi Wang et al. In-Plane Shape-Deviation Modeling and Compensation for Fused Deposition Modeling Processes, Apr. 27, 2016, IEEE. all pages. (Year: 2016).*

(Continued)

*Primary Examiner* — Howard Cortes
(74) *Attorney, Agent, or Firm* — Michael Dryja (57) ABSTRACT

In an example, a method includes receiving, by at least one processor, object model data describing a geometry of at least part of at least one object to be generated using additive manufacturing. The object model data defines a first geometrical transformation to be applied to the object model data. It may be determined if a second geometrical transformation is to be applied to the object model data. If a second geometrical transformation is to be applied, the first and second geometrical transformations may be applied to the object model data to determine modified object model data. Otherwise, the first geometrical transformation may be applied to the object geometry to determine modified object model data.

20 Claims, 4 Drawing Sheets

(56) References Cited

U.S. PATENT DOCUMENTS

| | | | |
|---|---|---|---|
| 2015/0352794 A1* | 12/2015 | Nguyen | B22F 10/25 |
| | | | 700/98 |
| 2016/0136898 A1 | 5/2016 | Jang et al. | |
| 2016/0158962 A1 | 6/2016 | Balistreri et al. | |
| 2016/0320771 A1* | 11/2016 | Huang | B33Y 50/00 |
| 2016/0332384 A1* | 11/2016 | De Pena | B33Y 50/02 |
| 2016/0349724 A1 | 12/2016 | Cortes | |
| 2017/0203515 A1 | 7/2017 | Bennett et al. | |
| 2017/0239892 A1* | 8/2017 | Buller | B28B 17/0081 |
| 2017/0368753 A1* | 12/2017 | Yang | G01B 21/20 |
| 2017/0372480 A1* | 12/2017 | Anand | G06F 30/20 |
| 2018/0350156 A1 | 12/2018 | Tsukikawa | |
| 2019/0291184 A1* | 9/2019 | Buller | B29C 64/20 |

FOREIGN PATENT DOCUMENTS

| | | |
|---|---|---|
| WO | WO-2018/017101 | 1/2018 |
| WO | WO-2018/140033 | 8/2018 |
| WO | WO-2019/005708 A2 | 1/2019 |
| WO | WO-2019008355 A1 | 1/2019 |

OTHER PUBLICATIONS

Shukri Afazov et al. A methodology for precision additive manufacturing through compensation, Oct. 2017, ScienceDirect, all pages (Year: 2017).*

* cited by examiner

GEOMETRICAL TRANSFORMATIONS IN ADDITIVE MANUFACTURING

BACKGROUND

Additive manufacturing techniques may generate a three-dimensional object through the solidification of a build material, for example on a layer-by-layer basis. In examples of such techniques, build material may be supplied in a layer-wise manner and the solidification method may include heating the layers of build material to cause melting in selected regions. In other techniques, chemical solidification methods may be used.

BRIEF DESCRIPTION OF DRAWINGS

Non-limiting examples will now be described with reference to the accompanying drawings, in which.

DETAILED DESCRIPTION

Additive manufacturing techniques may generate a three-dimensional object through the solidification of a build material. In some examples, the build material is a powder-like granular material, which may for example be a plastic, ceramic or metal powder and the properties of generated objects may depend on the type of build material and the type of solidification mechanism used. In some examples the powder may be formed from, or may include, short fibres that may, for example, have been cut into short lengths from long strands or threads of material. Build material may be deposited, for example on a print bed and processed layer by layer, for example within a fabrication chamber. According to one example, a suitable build material may be PA12 build material commercially referred to as V1R10A "HP PA12" available from HP Inc.

In some examples, selective solidification is achieved using heat in a thermal fusing additive manufacturing operation. This may comprise directional application of energy, for example using a laser or electron beam which results in solidification of build material where the directional energy is applied. Examples of such techniques include selective laser sintering and high-speed laser sintering. In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be derived from structural design data). The fusing agent may have a composition which absorbs energy such that, when energy (for example, heat) is applied to the layer, the build material heats up, coalesces and solidifies upon cooling, to form a slice of the three-dimensional object in accordance with the pattern. In other examples, coalescence may be achieved in some other manner.

According to one example, a suitable fusing agent may be an ink-type formulation comprising carbon black, such as, for example, the fusing agent formulation commercially referred to as V1Q60A "HP fusing agent" available from HP Inc. In one example such a fusing agent may comprise any or any combination of an infra-red light absorber, a near infra-red light absorber, a visible light absorber and a UV light absorber.

In addition to a fusing agent, in some examples, a print agent may comprise a coalescence modifier agent, which acts to modify the effects of a fusing agent for example by reducing or increasing coalescence or to assist in producing a particular finish or appearance to an object, and such agents may therefore be termed detailing agents. In some examples, detailing agent may be used near edge surfaces of an object being printed to reduce or prevent coalescence by, for example, cooling the build material or through some other mechanism. According to one example, a suitable detailing agent may be a formulation commercially referred to as V1Q61A "HP detailing agent" available from HP Inc.

A coloring agent, for example comprising a dye or colorant, may in some examples be used as a fusing agent or a coalescence modifier agent, and/or as a print agent to provide a particular color for the object. Examples of print agents comprising dye based colored ink and pigment based colored ink include inks commercially referred to as CE039A and CE042A available from HP Inc.

As noted above, additive manufacturing systems may generate objects based on structural design data. This may involve a designer designing a three-dimensional model of an object to be generated, for example using a computer aided design (CAD) application. The model may define the solid portions of the object. To generate a three-dimensional object from the model using an additive manufacturing system, the model data may comprise, or can be processed to derive, slices or parallel planes of the model. Each slice may define a portion of a respective layer of build material that is to be solidified or caused to coalesce by the additive manufacturing system.

Figure 1:
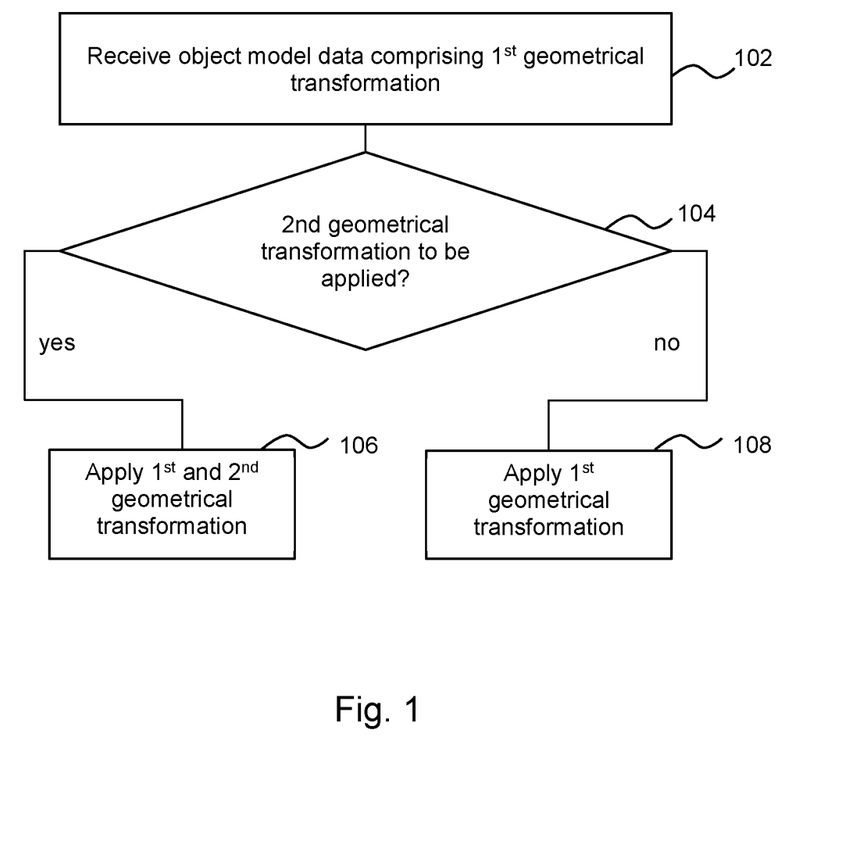
FIG. 1 is a flowchart of an example method of modifying object model data for additive manufacturing.

FIG. 1 is an example of a method, which may comprise a computer implemented method of determining at least one geometrical transformation to apply to object model data. The object model data (e.g. a CAD model) may be modified to compensate for anticipated deviations in dimensions when generating an object. In some examples, the method may be a method of selecting a processing pipeline for geometrical transformation.

For example, it may be the case that, where an object is generated in a process which includes heat, additional build material may adhere to the object on generation. In one example, fusing agent may be associated with a region of the layer which is intended to fuse. However, when energy is supplied, build material of neighbouring regions may become heated and fuse to the outside of the object (in some examples, being fully or partially melted, or adhering to melted build material as powder). Therefore, a dimension of an object may be larger than the regions to which fusing agent is applied. In order to compensate for this effect, i.e. where it is anticipated that an object may tend to 'grow' during manufacture, the object volume as described in object model data may be reduced.

In other examples, objects may be smaller following object generation than is specified in object model data. For example, some build materials used to generate objects may shrink on cooling. Therefore, a geometrical transformation may describe how an object volume in object model data should be increased to compensate for the anticipated reduction in volume.

A particular object may be subject to mechanisms which result in growth and/or shrinkage, and the appropriate transformation to apply may be influenced by the different degrees to which an object may be affected by such processes. In some examples, it may be intended to tailor a transformation to a particular object and/or a particular object generation operation, as is described in greater detail below.

The method comprises, in block 102, receiving, by at least one processor, object model data describing the geometry of at least part of at least one object to be generated using additive manufacturing, wherein the object model data also defines a first geometrical transformation to be applied to the geometry of the object as described in the object model data. For example, this may comprise a geometrical transformation to be applied to a geometrical model of at least part of an object, wherein the geometrical model of the object describes the geometry and is provided as part of the object model data. For example, the object model data may be retrieved from at least one memory, or received over a network or the like.

In some examples the object model data may describe the geometry of one or more objects as an object model, for example a geometrical model of at least part of an object. This may for example comprise a polygonal mesh (e.g. a STereoLithographic (STL) data file, or a 3MF data file) characterising the form of an object. In some examples, the object model data may comprise voxelised object model data, which represents the objects or portions of objects as a plurality of sub-volumes referred to herein as 'voxels' (i.e. three-dimensional pixels), wherein each sub-volume represents a region of the object which is individually addressable in object generation. In some examples, the object model data may comprise a stack of 2D slices, for example represented as polygons, or in some examples as slices rasterised into pixels of nominal depth corresponding to a layer of the object (i.e. voxels represented as 2D pixels).

In some examples, the object model data may describe a plurality of objects, and the plurality of objects may have a defined arrangement in space. This may for example model a 'virtual' fabrication chamber containing a batch of objects which are to be generated. In some examples, a geometrical transformation may be associated with each object and the geometrical transformation may be different for different objects (i.e. the geometry of each objects may be described, and may be associated with a particular geometrical transformation.

The first geometrical transformation may be defined using at least one scaling factor and/or at least one offset value, and in some examples associate a scaling factor and/or offset value with at least one of three orthogonal (e.g. x, y and z) axes. A scaling factor may be used to multiply a set of specified object dimensions in the direction of at least one axis by a value, which may be greater than 1 in order to increase the dimension(s) and less than 1 to reduce the dimension(s), or equal to 1 to have no effect. The scaling factor may be applied to dimensions of an object model. An offset may specify, for example by a specified distance or a number of defined voxels, an amount to add or remove from a surface of the object (or a perimeter within a layer). For example, an offset distance as measured in the direction of a normal from the object surface may be specified and the object may be eroded or dilated (i.e., inflated or enlarged) by this distance, for example by moving the vertices of a mesh, although other methods of providing an offset may be used in other examples.

In some examples, the first geometrical transformation may be defined using up to, or exactly, six parameters describing the scaling factor and offset value for each of the three axes of three-dimensional space (wherein a scaling factor may be 1 and/or an offset value may be 0 if no scaling/offset is indicated in a particular axis).

Block 104 comprises determining, by at least one processor (which may be the same or different processor(s) to those referred to in block 102), whether a second geometrical transformation is to be applied to the object model data.

The second geometrical transformation may have any of the attributes discussed above in relation to the first geometrical transformation, for example comprising at least one scaling factor and at least one offset parameter. Unlike the first geometrical transformation which was provided with the object model data, the second geometrical transformation may not be derivable from the object model data alone. In some examples, the second geometrical transformation may be held in a memory or the like, or derivable based on information held in a memory.

In some examples, determining whether the second geometrical transformation is to be applied to the object model data comprises identifying metadata indicative of whether the second geometrical transformation is to be applied to the object model data. For example, the object model data in respect of a particular object may be associated with a label indicative of whether an additional geometrical transformation (i.e. in addition to the first geometrical transformation defined in the object model data) is to be applied. In other examples, determining whether the second geometrical transformation is to be applied to the object model data may comprise seeking user input, or determining a default status for an object data processing pipeline, or the like.

In some examples, the method may further comprise determining the second geometrical transformation. In some examples, this may for example be retrieved from a memory and/or derived from a geometrical compensation model or the like.

If it is determined in block 104 that the second geometrical transformation is to be applied, the method proceeds to block 106, which comprises applying, by at least one processor (which may be the same or different processor(s) to those referred to in block 102 and/or block 104), the first and second geometrical transformations to the object geometry (for example, to the geometrical model of the object as provided in the object model data) to determine modified object model data.

For example, if the first geometrical transformation for a first object specifies scaling factors for the x,y, and z axes of $[S_{x1}, S_{y1}, S_{z1}]$ and offset values as distances of $[O_{x1}, O_{y1}, O_{z1}]$ and the second geometrical transformation for an object specifies scaling factors of $[S_{x2}, S_{y2}, S_{z2}]$ and offset values of $[O_{x2}, O_{y2}, O_{z2}]$, then the first object model may be scaled by scaling factors $[S_{x1}*S_{x2}, S_{y1}*S_{y2}, S_{z1}*S_{z2}]$ and by offset values $[O_{x1}+O_{x2}, O_{y1}+O_{y2}, O_{z1}+O_{z2}]$. This assumes that the offsets are absolute values rather than, for example, proportions as may be the case in some examples, in which case the values may be combined as appropriate. In another example, the first and second transformations may be applied one after the other.

Otherwise (i.e. if it is determined in block 104 that the second geometrical transformation is not to be applied), the method proceeds to block 108, which comprises applying, by at least one processor (which may be the same or different processor(s) to those referred to in block 102, 104 and/or block 106) the first geometrical transformation (without the second geometrical transformation) to the described geometry (for example, to the geometrical model of the object as provided in the object model data) to determine modified object model data.

Thus, a mesh may be increased or decreased in scale and/or by an offset by the first geometrical transformation alone, or by a combination of the first and second geometrical transformations.

This allows different geometrical compensations to be considered at different stages. For example, the first geometrical transformation may be intended to compensate for object deformations associated with factors which are applicable for a plurality of object generation operations. For example, such factors may comprise at least one of an object volume of an object, surface area of an object, or, in the case that a fabrication 'batch' of objects is considered and the relative positions of the objects of the batch is predetermined, the intended placement of the an object in a fabrication chamber relative to at least one other object.

In some examples, characteristics of the object, such as consideration of the object volume and/or surface area, may be used as input parameters in a geometrical compensation model, as these may be associated with characteristic deformation behaviour.

For example, bulkier objects (i.e. objects having a larger volume) may accrue greater thermal energy than smaller objects, and may therefore tend to accumulate more heat than smaller objects. Cooling such objects may therefore take more time than cooling less bulky objects. This may lead to different deformations. Thus, in one example a geometrical compensation model may map object volumes to geometrical transformations, and this may, at least in part, form the basis of the first geometrical transformation for an object based on the volume of that object.

The surface area (and combinations of the volume and surface area) may be used to determine how 'solid' an object is. The amount of solid material in an object may be used to predict how the object may deform. For example, a more solid object may tend to accumulate more heat than a less solid object in a thermal fusing additive manufacturing operation. Such object parameters may therefore, individually or in combination, be mapped to different geometrical compensation parameters within a geometrical compensation model.

It may be noted that the object volume and surface area are inherent to the object model for a given object, and therefore compensating for deformations associated with such factors may be common to all build operations for that object. Therefore, geometrical transformations to compensate for such factors may be predetermined and used over a number of different build operations to generate the objects, even when at least some object generation parameters may be unknown.

In the case of a fabrication batch of objects, the relative placement of objects can be associated with characteristic deformation. For example, closely packed objects may cause more mutual heating than objects having greater spacing. However, in some examples, such batches may be defined for repeated object generation operations, and therefore these factors may be common to a plurality of build operations intended to generate the batch. Therefore, geometrical transformations to compensate for such factors may be predetermined and used over a number of different build operations to generate the objects, even when at least some object generation parameters may be unknown.

The second geometrical transformation may be to compensate for object deformations associated with factors associated with a particular object generation operation. Such factors may comprise, for example, a choice of object generation apparatus, object generation materials or object generation apparatus parameters such as temperature settings, object generation modes (e.g. fast or slow), environmental conditions and the like).

For example, a first build material may be associated with a particular shrinkage factor, and this may be compensated for with a complementary scaling to increase the object model size if the first build material is selected for object generation. However, a second build material may be associated with a different shrinkage factor, and therefore a different complementary scaling factor may be used if the second build material is selected for object generation. As the first geometrical transformation may be intended to be applied to object models for use in a plurality of different object generation operations, the choice of build material for a given build operation may not be determined at the point the first geometrical transformation is determined. Put another way, it may be intended that the first geometrical transformation can be applied regardless of the choice of build material. Therefore, in some examples, geometrical transformations associated with the choice of build material may comprise part of the second geometrical transformation data. In some examples, characteristic deformations may vary for batch to batch, or depend on a mix of the build material in use. Other factors such as the environment (e.g. temperature and/or humidity) may be associated with characteristic deformation(s).

In some examples, a choice of object generation/additive manufacturing apparatus may be associated with characteristic deformations.

In some examples, deformations may vary within a particular apparatus. For example, it may be the case that dimensional deformation is related to the location of object generation, and therefore different compensation/transformation parameters may be applied for different object locations to improve accuracy. In such examples, a geometrical compensation model from which the second geometrical transformation may be determined may take account of an intended location of an object in a fabrication chamber.

Such geometrical compensation models may comprise or provide compensation values which may be mapped to the intended location of an object (which may for example be a single identifiable point such as the location of the centre of mass of the object, or may include a consideration of the volumetric extent of the object). For example, if an object is to be generated at a first location within the fabrication chamber, the location may be mapped to a geometrical transformation comprising at least one offset and/or scaling factors. However, if the same object were to be generated at a second location within the fabrication chamber, this second location may be mapped to a different geometrical transformation comprising different offset value(s) and/or scaling factor(s). Thus, the particular geometrical transformation applied may vary between different locations based on predetermined mappings or the like. Such models may for example be associated with individual additive manufacturing apparatus, or with a family or class of apparatus.

In some such examples, at least one geometrical compensation model may comprise a plurality of defined geometrical transformation values (or value sets), each associated with different locations within the fabrication chamber. Geometrical transformation value(s) to apply at locations intermediate to such defined locations may be generated for example by interpolation, or by selection of the closest defined location, or the like.

Such models may be predetermined, for example having been derived experimentally, or determined using theory, or the like.

As such, a geometrical transformation may be associated with a choice of object generation/additive manufacturing apparatus. As the first geometrical transformation may be intended to be applied to object models for generation in a plurality of different apparatus, the choice of apparatus may not be determined when the first geometrical transformation is determined. In other words, it may be intended that the first geometrical transformation can be applied regardless of whether the apparatus has been selected. As such, in some examples geometrical transformations associated with the choice of additive manufacturing apparatus may comprise at least part of the second geometrical transformation data.

The method of FIG. 1 allows different geometrical transformations to be associated with object model data at different stages in the data processing pipeline, for example allowing first geometrical transformation(s) (which may be, or are likely to be, common to a number of build operations) to be associated with object model data at a relatively early stage and 'reused', whereas second geometrical transformation(s) (which may be, or are likely to be, dependent on a choice of additive manufacturing apparatus/parameters) may be associated with object model data at a relatively late stage in the data processing pipeline.

In other words, geometrical compensations which are likely to be common to a range or a number of apparatus/ object generation operations could be precomputed and provided as the first geometrical transformation while those described in the second geometrical transformation, which are likely to apply to a specific apparatus/object generation operation, may be applied to object model data subsequently (for example, individually, or on a build operation-by-build operation basis). This may ease processing requirements towards the end of the data processing pipeline as the first geometrical transformation need not be derived, but may allow the geometry of the object model to be transformed once based on more than one set of transformation parameters.

Figure 2:
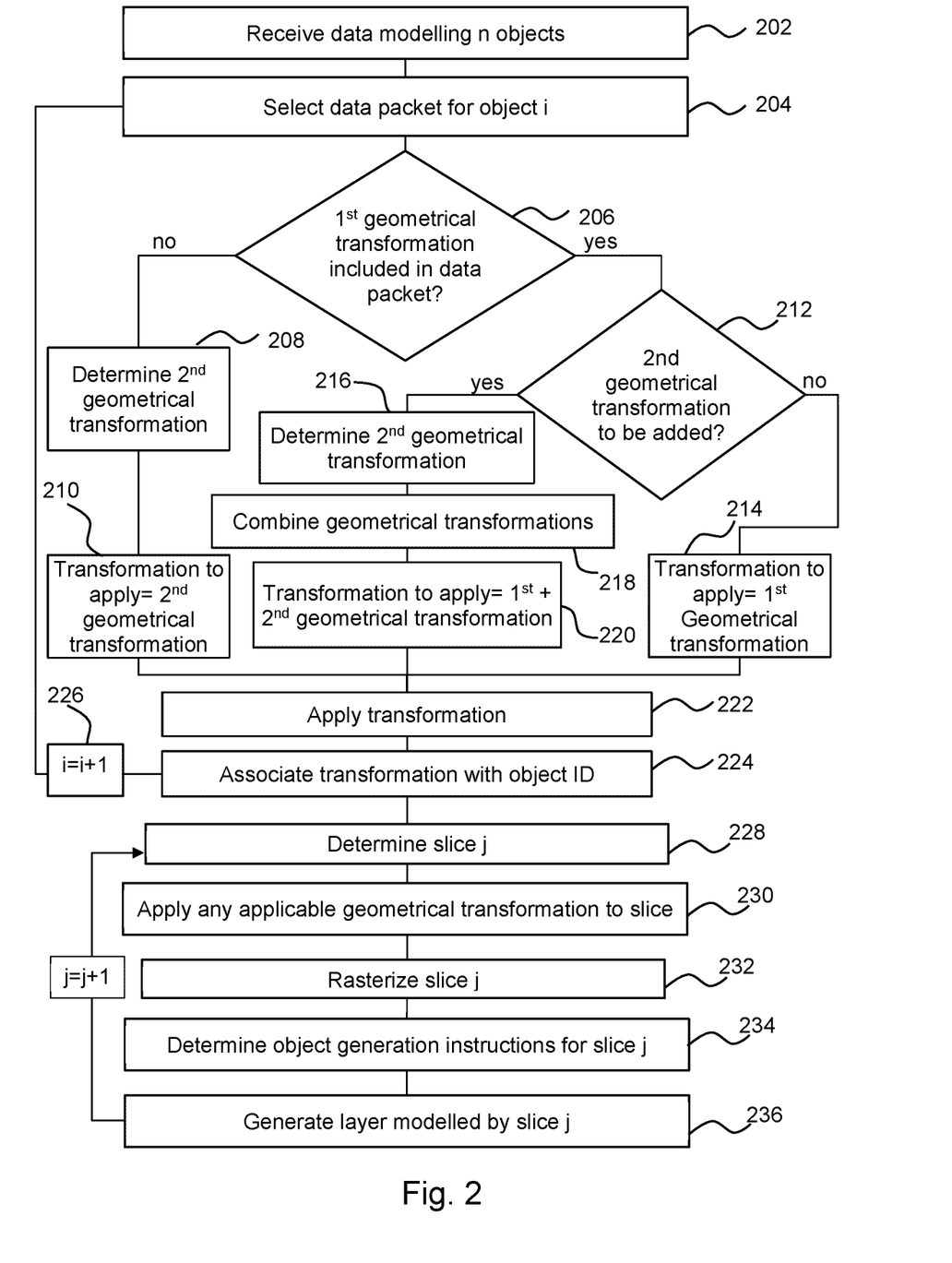
FIG. 2 is a flowchart of an example method of object generation for a batch of objects.

FIG. 2 is an example of a method for generating a batch of n objects in a single additive manufacturing operation, where n is any integer.

Block 202 comprises receiving data describing the 'batch' at a processor. The data in this example is divided into data packets (which may be individual files, or may be portions of data identified by metadata, headers or the like), wherein each data packet describes one of the n objects. Each data packet comprises a geometrical description of the object. At least one of the data packets includes a first geometrical transformation for the associated object and an indication of whether the first geometrical transformation is to be performed alone or in combination with a second geometrical transformation which is associated with additive manufacturing apparatus in which the 'batch' is to be generated. For example, the first geometrical transformation, where present, may specify at least one scaling factor and at least one offset value, and in this example, specifies three scaling factors and three offset values, although in some examples these may be intended to have a neutral impact (i.e. a scaling factor of 1 or an offset value of 0). These may for example be based on any or any combination of the volume of an object, its surface area and the proportion of a volume of the intended fabrication chamber local to the object generation location which is intended to be solidified (i.e. an indication of how closely packed the object is to other objects).

The indication of whether the first geometrical transformation is to be performed alone, or in combination with a second geometrical transformation in this example comprises a metadata tag specifying one of "override" in the case that the first geometrical transformation is to be applied without the second geometrical transformation or "incremental" in the case that the first geometrical transformation is to be applied in combination with the second geometrical transformation.

In this example, the data packet for each object model further comprises an object ID, which may be different for the objects of the batch, and an indication of the intended location of object generation.

The data packets may comprise additional information, for example object property information such as object color(s), density, strength or the like, which may be used when determining instructions for generating the object.

The method then proceeds by, in block 204, selecting a data packet for an object i of the n objects (where i may be an index which is initially set to 0) and determining, in block 206, if the data packet includes a first geometrical transformation. If not, the method proceeds to block 208, and a second geometrical transformation is determined for that object. In this example, the intended additive manufacturing apparatus is associated with a predetermined geometrical compensation model which comprises a plurality of defined geometrical transformation value sets, each associated with different locations within the fabrication chamber. Therefore, determining the second geometrical transformation comprises mapping the indication of the intended location of object generation provided with the data packet to a geometrical transformation, and the second geometrical transformation may therefore be different for different objects.

In this branch of the method, the method proceeds to block 210, the geometrical transformation to apply to the object is identified as the second geometrical transformation. By using a suitable compensation model—i.e. a compensation model which is tailored to a particular apparatus—to modify object model data, an object once formed may end up being closer to an intended size.

If however, it is determined in block 206 that a first geometrical transformation is provided, the method proceeds to block 212, which comprises determining if the data packet indicates the first geometrical transformation is to be performed alone (i.e. the metadata tag is "override") or in combination with the second geometrical transformation (i.e. the metadata tag is "incremental").

If the first geometrical transformation is to be performed alone, the method proceeds to block 214, in which the geometrical transformation to apply to the object is identified as the first geometrical transformation. This may for example be useful when a build operation is intended for specific apparatus, and this is determined relatively early in the processing pipeline. The first geometrical transformation may be adapted for the geometry and apparatus, and thus the second geometrical transformation may be ignored (and the retrieval of parameters and the like may be avoided, conserving processing resources). In other examples, the choice to use the first geometrical transformation alone may be made for some other reason.

If however in block 212, the indication is that the first geometrical transformation is to be performed in combination with the second geometrical transformation, the method proceeds to block 216, which comprises determining the second geometrical transformation for the object model data (for example as described in relation to block 208). In block 218, the first and second geometrical transformations are combined to provide a combined transformation, and in block 220, the geometrical transformation to apply to the object is identified as the combined geometrical transformation.

Block 222 comprises applying the applicable transformations to the geometrical object model data. For example, a scaling factor may be applied at this stage. While in some examples, an offset may be applied at this stage, in other examples this may be applied following slicing, or following voxelisation of the object model data as described below. In some examples, geometrical transformations may be applied to the mesh and/or slices thereof as the dimensions after voxelisation may be in units of voxels, which may be larger than the intended change of dimensions.

Block 224 comprises associating the identified geometrical transformation with data describing the object, and in particular in this example, this is associated with the object ID provided with the data packet. For example, this may associate values of the second geometrical transformation with data describing an object to be generated, for example with a data record associated with the object. In some examples, this may comprise including the first and second transformation values, and/or the combination thereof, in the data record. This may be useful in tracking and evaluation operations, for example in subsequent analysis of the effectiveness of a particular geometrical transformation and/or geometrical compensation model.

The method may then increment i (block 226), and repeat until all n objects have been considered.

Block 228 comprises determining a slice j of the 'batch' corresponding to a predetermined height of the fabrication chamber, which may intersect with none, one, or more than one objects. Block 230 comprises, if applicable, applying any further geometrical transformation (for example, an offset if scaling has been applied previously) to the object portions defined by the slice. Block 232 comprises rasterising the slice to define voxels having an implicit depth based on the slice spacing, and which corresponds to an intended layer thickness in object generation. As noted above, in some examples, geometrical transformations may be applied before rasterization rather than after, because this process results in the model being "discretized" to voxels. Thus, in some examples, adding or removing voxels can over-compensate fora deformation and may introduce additional errors. However, a transformation may be applied at any point, including after voxelisation.

Block 234 comprises determining object generation instructions for layer i from the object model data comprising any compensations. The object generation instructions (also referred to as control data or print instructions herein) in some examples may specify an amount of print agent to be applied to each of a plurality of locations on a layer of build material. An amount of print agent (or no print agent) may be associated with each of the voxels. For example, if a voxel relates to a region of a build volume which is intended to solidify, the object generation instructions may be determined to specify that fusing agent should be applied to a corresponding region of build material in object generation. If however a voxel relates to a region of the build volume which is intended to remain unsolidified, then object generation instructions may be determined to specify that no agent, or a coalescence modifying agent such as a detailing agent, may be applied thereto, for example to cool the build material. In addition, the amounts of such agents may be specified in the generated instructions, for example as instructions to print one or more dots of one or more agent on to a region of build material corresponding to a voxel, and these amounts may be determined based on, for example, thermal considerations and the like. In other examples, object generation instructions may specify how to direct directed energy (for example, using selective laser sintering or high-speed laser sintering), or how to place a binding agent or the like.

Block 236 comprises generating layer j using the object generation instructions. Generating an object may comprise generating the object based on object generation instructions (which may be referred to as 'print instructions'). For example, such an object may be generated layer by layer. For example, this may comprise forming a layer of build material, applying print agents, for example through use of 'inkjet' liquid distribution technologies in locations specified in the object generation instructions for an object model slice corresponding to that layer using at least one print agent applicator, and applying energy, for example heat, to the layer. Some techniques allow for accurate placement of print agent on a build material, for example by using print heads operated according to inkjet principles of two-dimensional printing to apply print agents, which in some examples may be controlled to apply print agents with a resolution of around 600 dots per inch (dpi), or 1200 dpi. In other examples, objects may be generated using directed energy, or through use of chemical binding or curing, or in some other way.

The method then repeats by identifying data relating to layer j+1, until all slices are processed.

In some examples, at least part of the method may be carried out by processing circuitry of an additive manufacturing apparatus which is intended to generate the objects in block 236. In some examples, at least some blocks may be carried out in parallel or concurrently. This may comprise parallel data processing of different object model data packets, and/or one slice of object model data may be processed to determine object generation instructions for generating a corresponding layer in an additive manufacturing operation while a previous layer is being generated. This reduces the need to store processed object generation instructions (which can be large, and thus consume significant memory resources). In addition, the time-consuming processing stage may be combined with the object generation processing time, which is efficient. In some additive manufacturing operations, a consistent layer generation time is indicated as this results in a more consistent outcome (for example, less warping than may be seen if some layers may be allowed to cool for longer than others). Therefore, the processing of the data may be such that the time to process the data of a slice is at least not substantially longer than the time to generate a layer. By having at least part of a deformation included with object model data and a pipeline which may, if appropriate, avoid determination of a second geometrical transformation, processing resources of such an additive manufacturing apparatus may be conserved, and/or the intended slice processing time may be more readily attainable.

In some examples, the method of FIG. 2 is implemented by processing circuitry and additive manufacturing components of an additive manufacturing apparatus.

Figure 3:
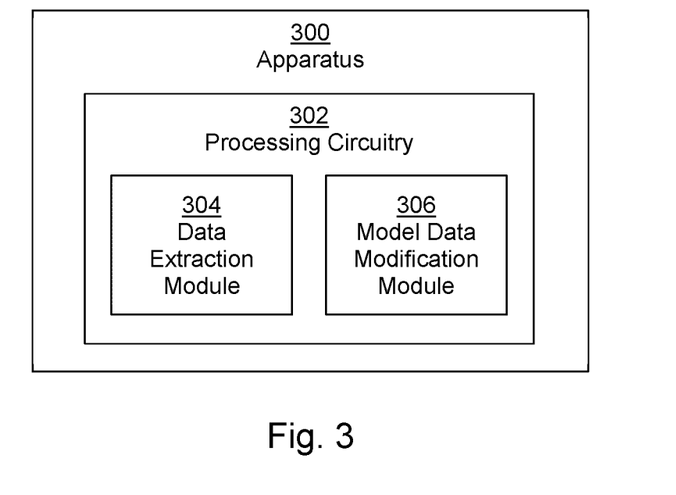
FIGS. 3 and 4 are simplified schematic drawings of example apparatus for additive manufacturing.

FIG. 3 shows an example of an apparatus 300 comprising processing circuitry 302, the processing circuitry 302 comprising a data extraction module 304 and a model data modification module 306.

In use of the apparatus 300, the data extraction module 304 extracts, from a data package comprising object model data describing the geometry of at least part of at least one object to be generated using additive manufacturing, a geometrical transformation and an indication of a geometrical compensation processing pipeline for the object model data, wherein the indication of the geometrical compensation processing pipeline indicates whether at least one additional geometrical transformation is to be identified. The geometrical transformation may be specified on an object-by-object basis. The indication of the geometrical compensation processing pipeline may for example be provided as a metadata tag or label as described above. The geometrical transformation provided with the data packet, and/or to be identified may comprise at least one scaling factor and/or at least one offset value. The data packets may for example be individual files, or may be portions of data identified by metadata, headers or the like.

In use of the apparatus 300, the model data modification module 306 modifies object model data of the data package (for example the geometrical description of the object) based on the at least one extracted geometrical transformation and the extracted indication of the geometrical compensation processing pipeline. For example, the processing pipeline may indicate that a further geometrical transformation (which may have any of the features of the second geometrical transformation) is to be retrieved or determined (for example from a geometrical compensation model) and combined with the geometrical transformation specified in the data packet (which may have any of the features of the first geometrical transformation described above). Applying the geometrical transformation may comprise applying at least one scaling factor and/or offset value as described above.

Figure 4:
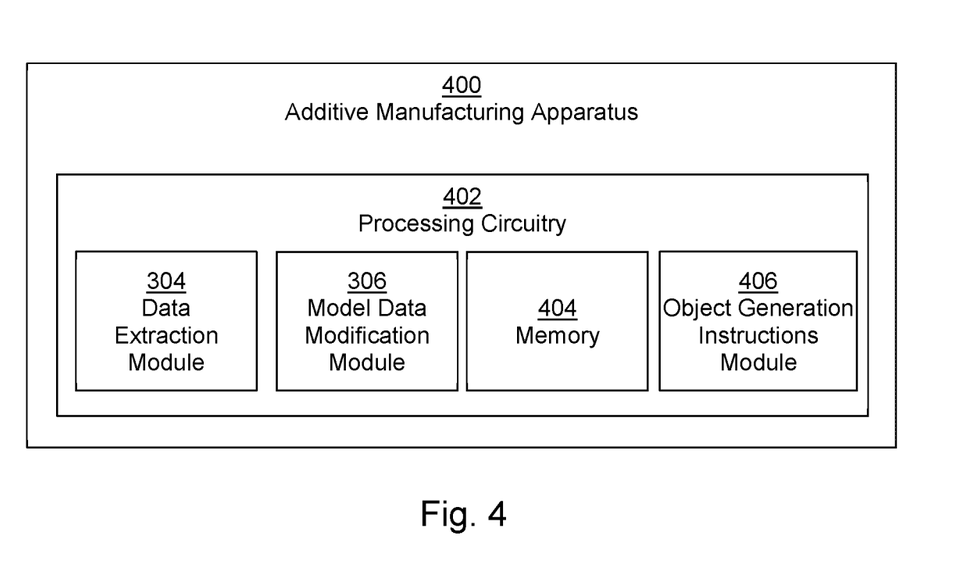

FIG. 4 shows an example of an additive manufacturing apparatus 400 comprising processing circuitry 402, wherein the processing circuitry 402 comprises the data extraction module 304 and the model data modification module 306 described in relation to FIG. 3. In addition, the additive manufacturing apparatus 400 further comprises a memory 404 and an object generation instructions module 406.

The memory 404 in this example stores a geometrical compensation model from which at least one further geometrical transformation may be derived if indicated by the extracted indication. For example, this may comprise a model associating object generation locations with geometrical transformations as described above. In some examples, a model may (additionally or alternatively) associate environmental conditions and/or build material compositions with geometrical transformations.

The object generation instructions module 406 determines, in use of the additive manufacturing apparatus 400, object generation instructions to generate an object from the object model data.

In use of the additive manufacturing apparatus 400, at least one object may be generated using the object generation instructions.

As discussed in greater detail above, the object generation instructions may in some examples specify an amount of print agent to be applied to each of a plurality of locations on a layer of build material.

The additive manufacturing apparatus 400, in use thereof, may generate the object in a plurality of layers (which may correspond to respective slices of an object model) according to object generation instructions. The additive manufacturing apparatus 400 may for example generate an object in a layer-wise manner by selectively solidifying portions of layers of build material. The selective solidification may in some examples be achieved by selectively applying print agents, for example through use of 'inkjet' liquid distribution technologies, and applying energy, for example heat, to the layer. In other examples, heat may be selectively applied (for example, using selective laser sintering or high-speed laser sintering), and/or chemical agents such as curing or binding agents may be applied. The additive manufacturing apparatus 400 may comprise additional components not shown herein, for example any or any combination of a fabrication chamber, a print bed, printhead(s) for distributing print agents, a build material distribution system for providing layers of build material, energy sources such as heat lamps and the like.

The processing circuitry 302, 402 or the modules thereof may carry out any of the blocks of FIG. 1 or any of blocks 202 to 234 of FIG. 2.

Figure 5:
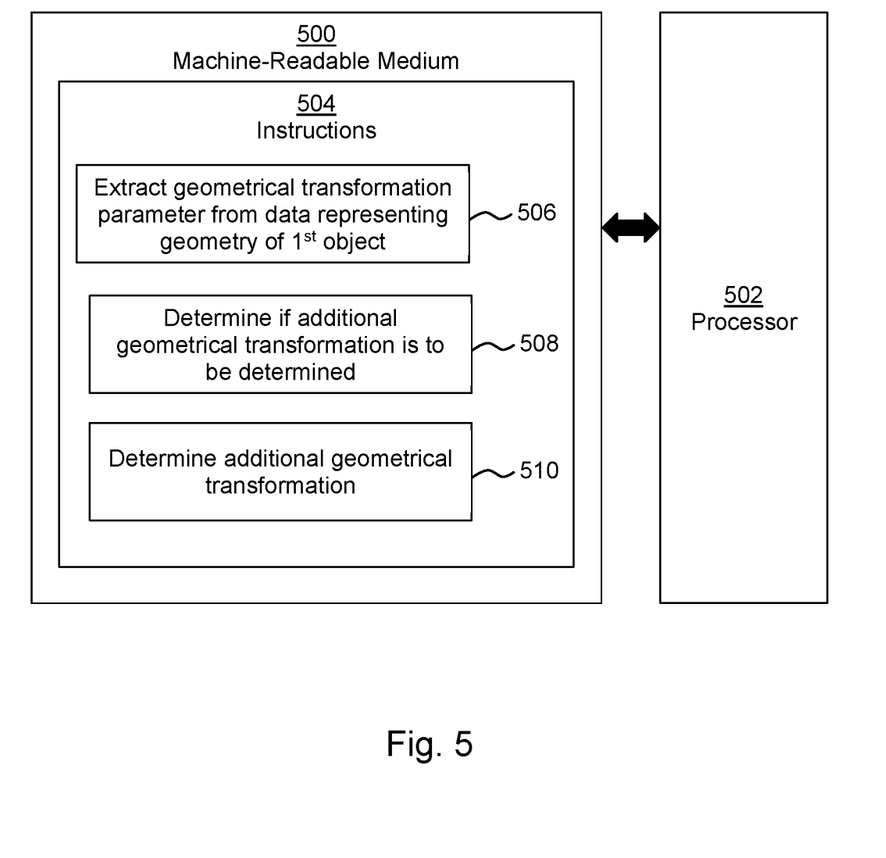
FIG. 5 is a simplified schematic drawing of an example machine-readable medium associated with a processor.

FIG. 5 shows a tangible machine-readable medium 500 associated with a processor 502. The machine-readable medium 500 comprises instructions 504 which, when executed by the processor 502, cause the processor 502 to carry out tasks. In this example, the instructions 504 comprise instructions 506 to cause the processor 502 to process data representing a geometry of a first object to extract at least one geometrical transformation parameter, instructions 508 to cause the processor 502 to determine if the data representing a geometry of a first object is associated with an indication that at least one additional geometrical transformation parameter which is not included there with is to be determined; and instructions 510 to cause the processor 502 to determine the additional geometrical transformation parameter and combine the determined additional geometrical transformation parameter with the extracted geometrical transformation parameter in modifying the data representing the first object, in the event that at least one additional geometrical transformation parameter is to be determined.

In some examples, the machine-readable medium 500 comprises instructions which, when executed by the processor 502, cause the processor 502 to associate the additional geometrical transformation parameter with a data record associated with the first object (in some examples in addition to, or in combination with the extracted geometrical transformation parameter) in the event that at least one additional geometrical transformation parameter is determined, for example as described in relation to block 224.

In some examples, the instructions when executed cause the processor 502 to carry out any of the blocks of FIG. 1 or any of blocks 202 to 234 of FIG. 2. In some examples, the instructions may cause the processor 502 to act as any part of the processing circuitry 302, 402 of FIG. 3 or FIG. 4.

Examples in the present disclosure can be provided as methods, systems or machine-readable instructions, such as any combination of software, hardware, firmware or the like. Such machine-readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each block in the flow charts and/or block diagrams, as well as combinations of the blocks in the flow charts and/or block diagrams can be realized by machine-readable instructions.

The machine-readable instructions may, for example, be executed by a general-purpose computer, a special purpose computer, an embedded processor or processors of other programmable data processing devices to realize the functions described in the description and diagrams. In particular, a processor or processing apparatus may execute the machine-readable instructions. Thus functional modules of the apparatus (such as the data extraction module 304, the model data modification module 306 and/or object generation instructions module 406) may be implemented by a processor executing machine-readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine-readable instructions may also be stored in a computer readable storage that can guide the computer or other programmable data processing devices to operate in a specific mode.

Machine-readable instructions may also be loaded onto a computer or other programmable data processing devices, so that the computer or other programmable data processing devices perform a series of operations to produce computer-implemented processing, thus the instructions executed on the computer or other programmable devices realize functions specified by block(s) in the flow charts and/or in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims. Based on means based at least in part on.

The features of any dependent claim may be combined with the features of any of the independent claims or other dependent claims.

The invention claimed is:

1. A method comprising:
   receiving, by an additive manufacturing apparatus, object model data for an object to be generated by the additive manufacturing apparatus, the object model data defining a first geometrical transformation and describing a geometry of the object unmodified by the first geometrical transformation, wherein the first geometrical transformation is based on either or both of a volume and a surface area of the object;
   determining, by the additive manufacturing apparatus, that a second geometrical transformation is to be applied to the object model data in addition to the first geometrical transformation, wherein the second geometrical transformation is not particular to a geometry of any object and is based on either or both of characteristics of object generation by the additive manufacturing apparatus and a build material to be used in the object generation;
   in response to determining that the second geometrical transformation is to be applied in addition to the first geometrical transformation, applying, by the additive manufacturing apparatus, the first and second geometrical transformations to the object model data to determine modified object model data for the object; and
   generating, by the additive manufacturing apparatus, the object from the build material in accordance with the modified object model data.

2. The method according to claim 1, wherein the first geometrical transformation is further based on a relative position of the object in relation to other objects within a virtual fabrication chamber, the object and the other objects to be generated by the additive manufacturing apparatus in a same batch,
   and wherein the second geometrical transformation is further based on an actual position of the object at which the object is to be generated within a fabrication chamber of the additive manufacturing apparatus, the fabrication chamber corresponding to the virtual fabrication chamber.

3. The method according to claim 1, wherein the first geometrical transformation is particular to the object.

4. The method according to claim 1, wherein the second geometrical transformation is based at least on the characteristics of the objection generation by the additive manufacturing apparatus, the characteristics comprising either or both of parameters of the additive manufacturing apparatus to be used in the object generation and an object generation mode of the additive manufacturing apparatus to be used in the objection generation.

5. The method according to claim 1, wherein the object model data further includes metadata indicating that that the second geometrical transformation is to be applied to the object model data in addition to the first geometrical transformation,
   and wherein determining that the second geometrical transformation is to be applied in addition to the first geometrical transformation comprises identifying the metadata within the object model data.

6. The method according to claim 1, wherein the second geometrical transformation is stored in the additive manufacturing apparatus and is not defined in the object model data.

7. The method according to claim 1, wherein the object model data for the object is first object model data for a first object, the method further comprising:
   receiving, by the additive manufacturing apparatus, second object model data for a second object to be generated by the additive manufacturing apparatus, the second object model data defining a third geometrical transformation and describing a geometry of the second object unmodified by the first geometrical transformation, wherein the third geometrical transformation is based on either or both of a volume and a surface area of the second object;
   determining, by the additive manufacturing apparatus, that the second geometrical transformation is to be applied to the second object model data in addition to the third geometrical transformation;
   in response to determining that the second geometrical transformation is to be applied to the second object model data in addition to the third geometrical transformation, applying the second and third geometrical transformations to the second object model data to determine modified second object model data for the second object; and generating, by the additive manufacturing apparatus, the second object from the build material in accordance with the modified second object model data.

8. The method according to claim 1, wherein the object model data for the object is first object model data for a first object, the method further comprising:

receiving, by the additive manufacturing apparatus, second object model data for a second object to be generated by the additive manufacturing apparatus, the second object model data defining a third geometrical transformation and describing a geometry of the second object unmodified by the first geometrical transformation, wherein the third geometrical transformation is based on either or both of a volume and a surface area of the second object;

determining, by the additive manufacturing apparatus, that the second geometrical transformation is not to be applied to the second object model data in addition to the third geometrical transformation;

in response to determining that the second geometrical transformation is not to be applied to the second object model data in addition to the third geometrical transformation, applying just the third geometrical transformation to the second object model data to determine modified second object model data for the second object; and generating, by the additive manufacturing apparatus, the second object from the build material in accordance with the modified second object model data.

9. An additive manufacturing apparatus comprising:
a processor; and
a memory storing instructions executable by the processor to:

receive object model data for an object to be generated by the additive manufacturing apparatus, the object model data defining a first geometrical transformation and describing a geometry of the object unmodified by the first geometrical transformation, wherein the first geometrical transformation is based on either or both of a volume and a surface area of the object;

determine that a second geometrical transformation is to be applied to the object model data in addition to the first geometrical transformation, wherein the second geometrical transformation is not particular to a geometry of any object and is based on either or both of characteristics of object generation by the additive manufacturing apparatus and a build material to be used in the object generation;

in response to determining that the second geometrical transformation is to be applied in addition to the first geometrical transformation, apply the first and second geometrical transformations to the object model data to determine modified object model data for the object; and generate the object from the build material in accordance with the modified object model data.

10. The additive manufacturing apparatus according to claim 9, wherein the first geometrical transformation is further based on a relative position of the object in relation to other objects within a virtual fabrication chamber, the object and the other objects to be generated by the additive manufacturing apparatus in a same batch, and wherein the second geometrical transformation is further based on an actual position of the object at which the object is to be generated within a fabrication chamber of the additive manufacturing apparatus, the fabrication chamber corresponding to the virtual fabrication chamber.

11. The additive manufacturing apparatus according to claim 9, wherein the first geometrical transformation is particular to the object.

12. The additive manufacturing apparatus according to claim 9, wherein the second geometrical transformation is based at least on the characteristics of the objection generation by the additive manufacturing apparatus, the characteristics comprising either or both of parameters of the additive manufacturing apparatus to be used in the object generation and an object generation mode of the additive manufacturing apparatus to be used in the objection generation.

13. The additive manufacturing apparatus according to claim 9, wherein the object model data further includes metadata indicating that that the second geometrical transformation is to be applied to the object model data in addition to the first geometrical transformation, and wherein determination that the second geometrical transformation is to be applied in addition to the first geometrical transformation includes identification of the metadata within the object model data.

14. The additive manufacturing apparatus according to claim 9, wherein the second geometrical transformation is stored in the additive manufacturing apparatus and is not defined in the object model data.

15. A non-transitory computer-readable data storage medium storing program code executable by an additive manufacturing apparatus to perform processing comprising:

receiving object model data for an object to be generated by the additive manufacturing apparatus, the object model data defining a first geometrical transformation and describing a geometry of the object unmodified by the first geometrical transformation, wherein the first geometrical transformation is based on either or both of a volume and a surface area of the object;

determining that a second geometrical transformation is to be applied to the object model data in addition to the first geometrical transformation, wherein the second geometrical transformation is not particular to a geometry of any object and is based on either or both of characteristics of object generation by the additive manufacturing apparatus and a build material to be used in the object generation;

in response to determining that the second geometrical transformation is to be applied in addition to the first geometrical transformation, applying the first and second geometrical transformations to the object model data to determine modified object model data for the object; and generating the object from the build material in accordance with the modified object model data.

16. The non-transitory computer-readable data storage medium according to claim 15, wherein the first geometrical transformation is further based on a relative position of the object in relation to other objects within a virtual fabrication chamber, the object and the other objects to be generated by the additive manufacturing apparatus in a same batch, and wherein the second geometrical transformation is further based on an actual position of the object at which the object is to be generated within a fabrication chamber of the additive manufacturing apparatus, the fabrication chamber corresponding to the virtual fabrication chamber.

17. The non-transitory computer-readable data storage medium according to claim 15, wherein the first geometrical transformation is particular to the object.

18. The non-transitory computer-readable data storage medium according to claim 15, wherein the second geometrical transformation is based at least on the characteristics of the objection generation by the additive manufacturing apparatus, the characteristics comprising either or both of parameters of the additive manufacturing apparatus to be used in the object generation and an object generation mode of the additive manufacturing apparatus to be used in the objection generation.

19. The non-transitory computer-readable data storage medium according to claim 15, wherein the object model data further includes metadata indicating that that the second geometrical transformation is to be applied to the object model data in addition to the first geometrical transformation, and wherein determining that the second geometrical transformation is to be applied in addition to the first geometrical transformation comprises identifying the metadata within the object model data.

20. The non-transitory computer-readable data storage medium according to claim 15, wherein the second geometrical transformation is stored in the additive manufacturing apparatus and is not defined in the object model data.

\* \* \* \* \*